Aug. 1, 1944. S. A. LIMPERT ET AL Re. 22,526

ROTARY RECIPROCATING COMPRESSOR

Original Filed July 24, 1935 6 Sheets-Sheet 1

INVENTORS:
SYLVEST A. LIMPERT
DECEASED BY
KATHERINE E. LIMPERT
ALEXANDER S. LIMPERT
EXECUTORS
ALEXANDER S. LIMPERT

By A. H. Burnerton, ATTORNEY.

ROTARY RECIPROCATING COMPRESSOR

Original Filed July 24, 1935 6 Sheets-Sheet 2

INVENTORS:
SYLVESTER A. LIMPERT,
DECEASED, BY
KATHERINE E. LIMPERT &
ALEXANDER S. LIMPERT
EXECUTORS
ALEXANDER S. LIMPERT

By W. H. Lawrence,
ATTORNEY.

ROTARY RECIPROCATING COMPRESSOR

Original Filed July 24, 1935 6 Sheets-Sheet 3

INVENTORS:
SYLVESTER A. LIMPERT DECEASED
BY KATHERIN E. LIMPERT
ALEXANDER S. LIMPERT &
EXECUTORS
ALEXANDER S. LIMPERT

By H. H. Rivenburgh, ATTORNEY.

Aug. 1, 1944. S. A. LIMPERT ET AL Re. 22,526

ROTARY RECIPROCATING COMPRESSOR

Original Filed July 24, 1935 6 Sheets-Sheet 4

INVENTORS:
SYLVESTER A. LIMPERT DECEASED
BY KATHERINE E. LIMPERT &
ALEXANDER S. LIMPERT
EXECUTORS
ALEXANDER S. LIMPERT

By W. H. Lovenartos ATTORNEY.

Aug. 1, 1944. S. A. LIMPERT ET AL Re. 22,526

ROTARY RECIPROCATING COMPRESSOR

Original Filed July 24, 1935 6 Sheets-Sheet 5

INVENTORS:
SYLVESTER A. LIMPERT DECEASED
BY KATHERINE E. LIMPERT &
ALEXANDER S. LIMPERT
EXECUTORS
ALEXANDER S. LIMPERT

By W. H. Lwemarton,
ATTORNEY.

ROTARY RECIPROCATING COMPRESSOR

Original Filed July 24, 1935 6 Sheets-Sheet 6

INVENTORS:
SYLVESTER A. LIMPERT DECEASED
BY KATHERINE E. LIMPERT
ALEXANDER S. LIMPERT
EXECUTORS
ALEXANDER S. LIMPERT

By W. H. Swearton ATTORNEY.

Reissued Aug. 1, 1944 Re. 22,526

UNITED STATES PATENT OFFICE 22,526

ROTARY RECIPROCATING COMPRESSOR

Sylvester A. Limpert, deceased, late of Bay Shore, N. Y., by Katherine E. Limpert and Alexander S. Limpert, executors, Bay Shore, N. Y., and Alexander S. Limpert, Bay Shore, N. Y.; said executors of said Sylvester A. Limpert, deceased, assignors to Katherine E. Limpert Original No. 2,201,188, dated May 21, 1940, Serial No. 32,868, July 24, 1935. Application for reissue December 15, 1943, Serial No. 514,429

33 Claims. (Cl. 230—175)

This invention relates to pneumatic compression apparatus and has for its particular objects the provision of a simple, compact, cheap and unusually efficient mechanism which is quiet in operation and ideally adapted for refrigeration and air conditioning purposes. Further advantages of such mechanism are hereinafter set forth.

In the accompanying drawings, wherein is illustrated certain embodiments of our invention:

Figure 1 is a central, vertical section of a compressor unit embodying our invention as especially designed for a refrigerating machine;

Figs. 2 and 3 are sections taken on the line 2—2 and 3—3, respectively, of Fig. 1;

Figure 1:
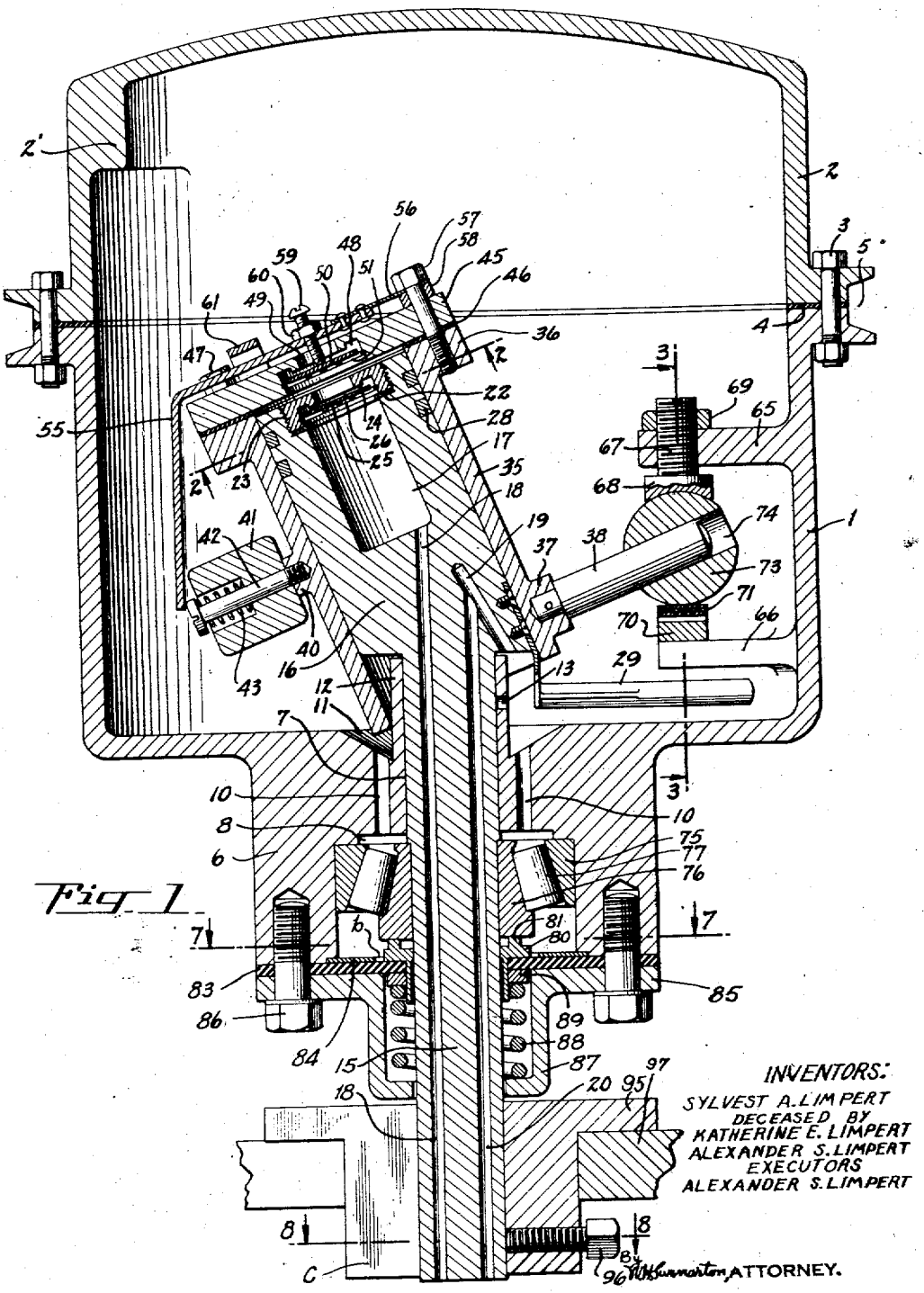
Figure 2:
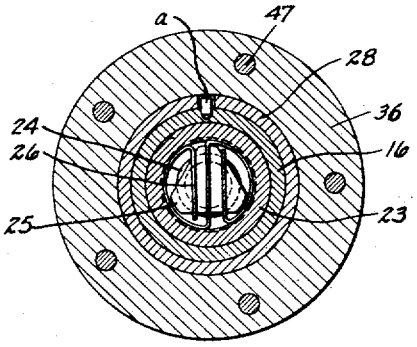
Figure 3:
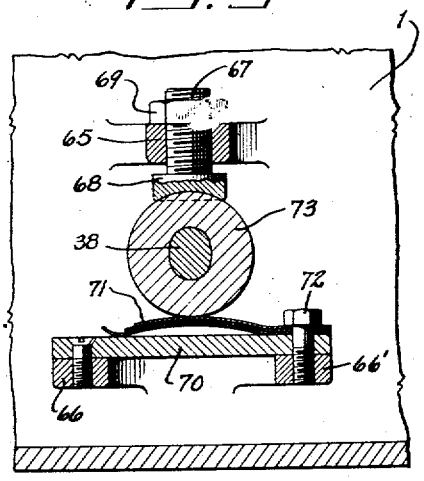
Figure 4:
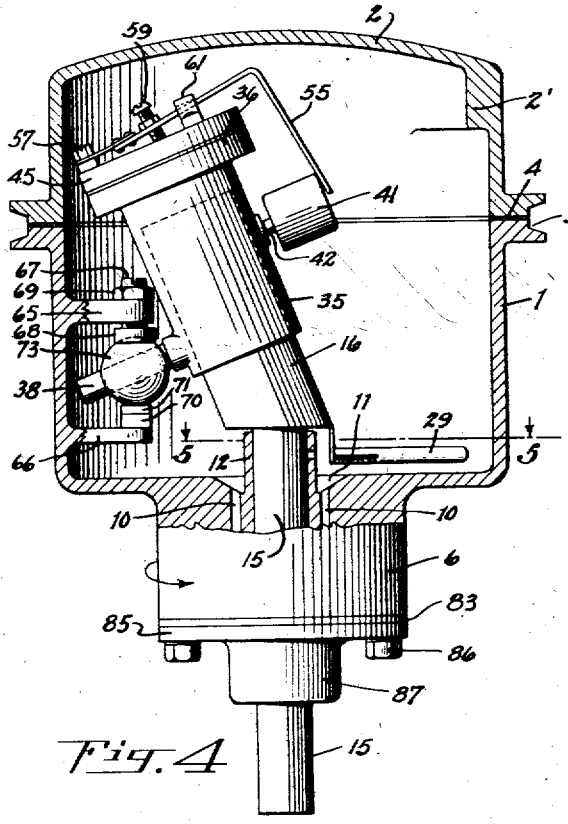
Fig. 4 is a vertical section, partly in elevation, of the compressor unit shown in Fig. 1 but showing the cylinder in a diametrically opposite position.
Figure 5:
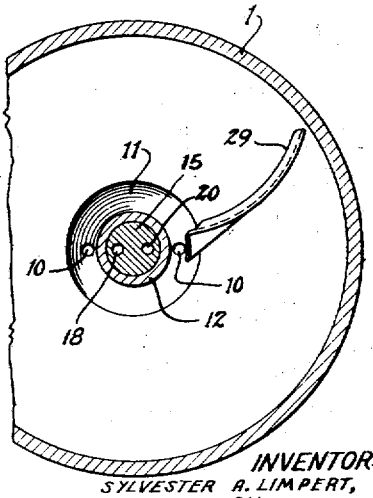
Fig. 5 is a transverse section on the line 5—5 of Fig. 4.
Figure 6:
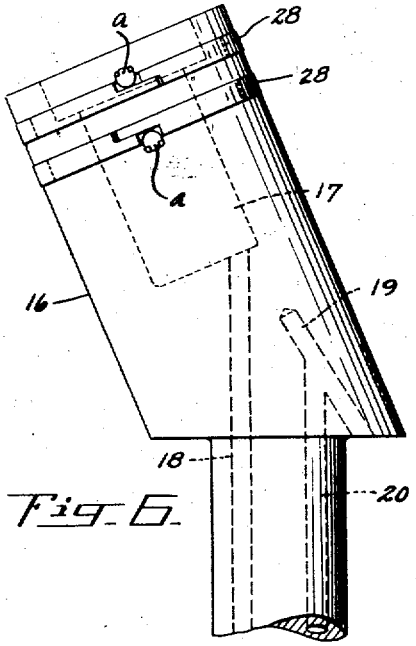
Fig. 6 is a fragmentary elevation of the piston shown in Fig. 1, isolated.
Figure 7:
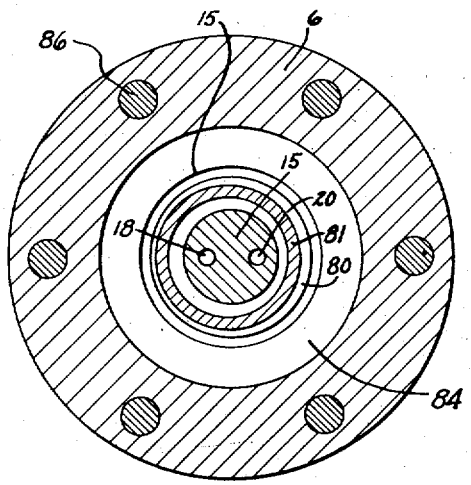
Figure 8:
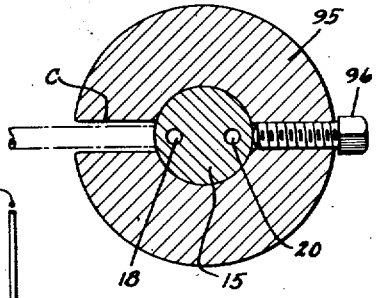
Figure 9:
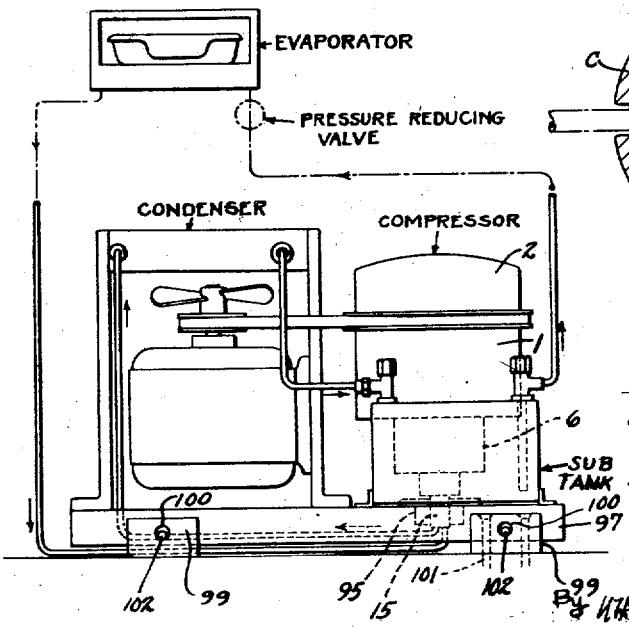
Figure 10:
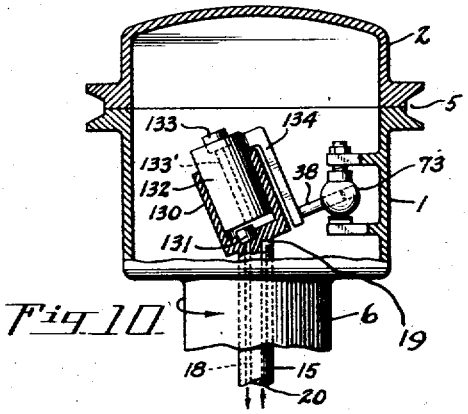
Figure 11:
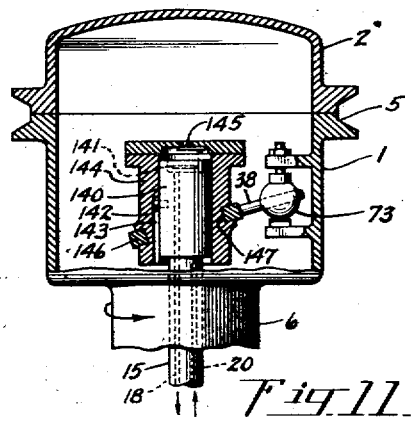
Figure 12:
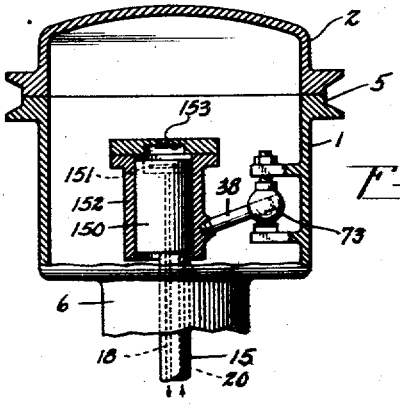
Figure 13:
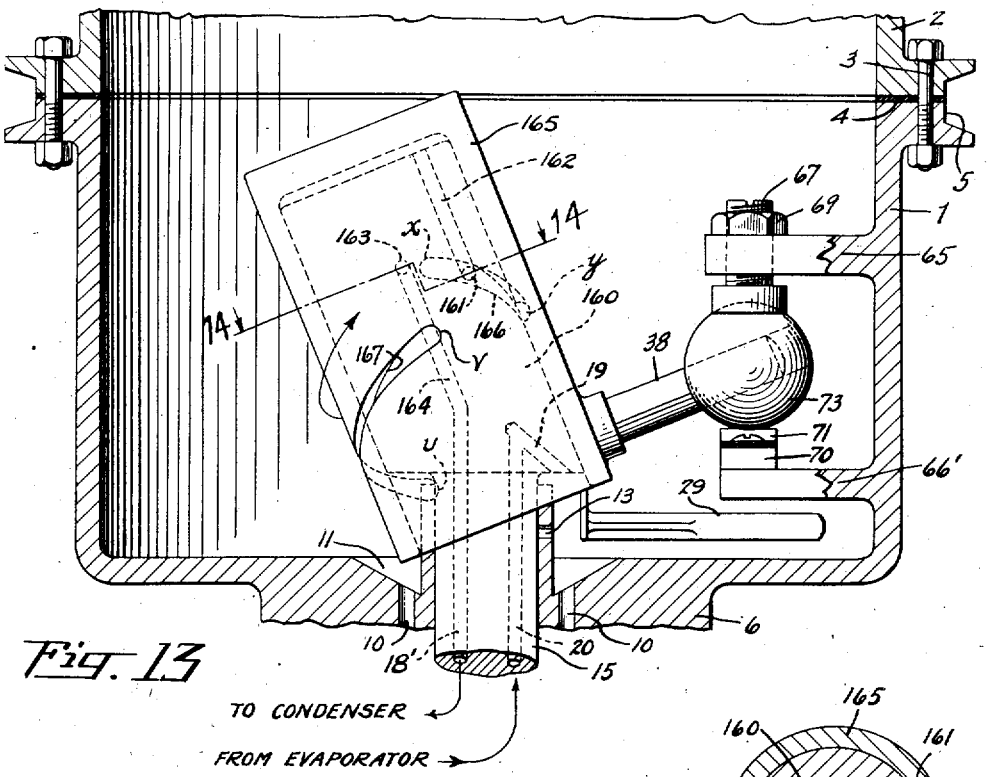
Figure 14:
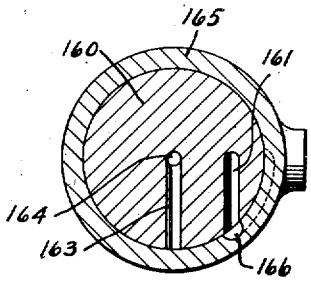
Figure 15:
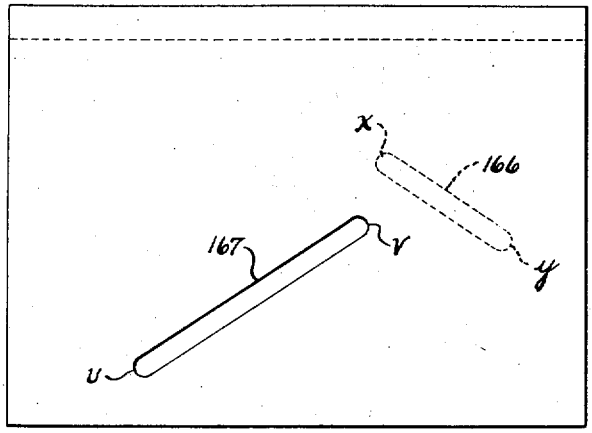
Figure 16:
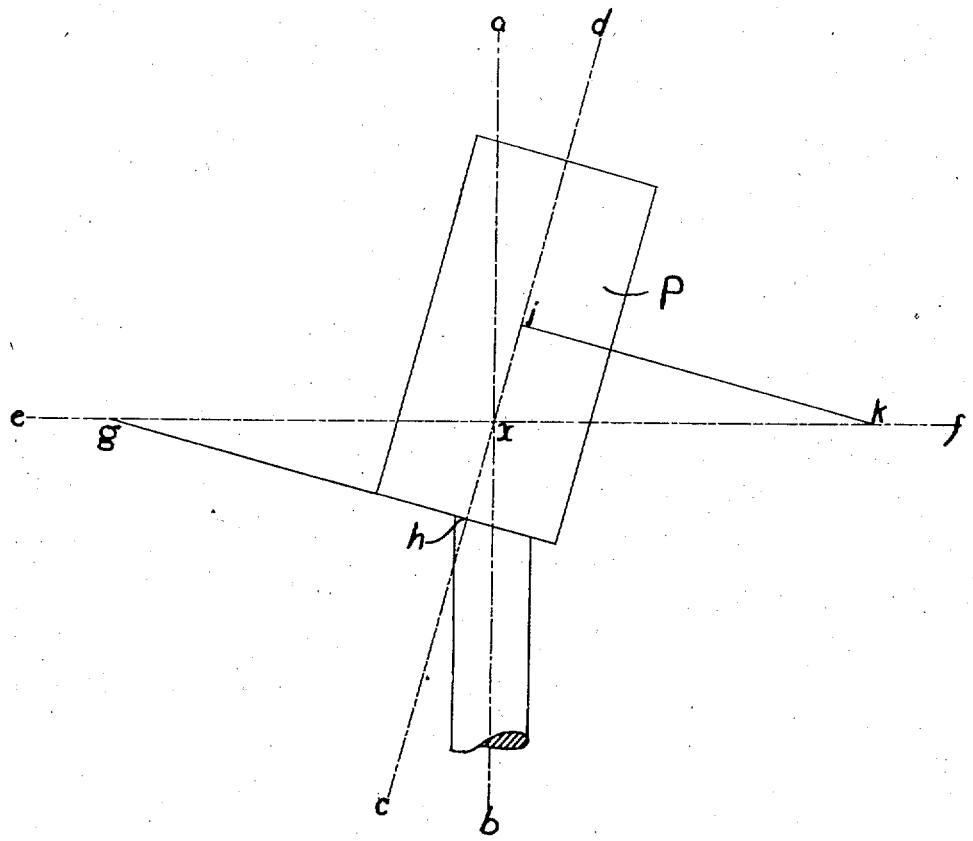
Figure 17:
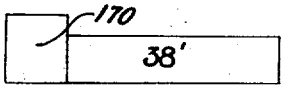

Figs. 7 and 8 are transverse sections on the line 7—7 and 8—8 respectively of Fig. 1;

Fig. 9 is an elevation, partly diagrammatic of a complete refrigerating unit embodying our invention which is intended for installation in a so-called domestic electrical refrigerator;

Fig. 10 is a vertical section, partly in elevation, of a compressor unit wherein a reciprocating piston is connected to the rotatable housing;

Fig. 11 is a vertical section, partly in elevation, of a further modification wherein the cylinder is vertically disposed and reciprocates without rotation thereof;

Fig. 12 is a vertical section, partly in elevation, of another form of compressor unit, wherein a vertical cylinder rotates and also reciprocates;

Fig. 13 is a fragmentary vertical section, partly in elevation, of a still further modification showing a compressor unit wherein ported valves are employed;

Fig. 14 is a section on the line 14—14 of Fig. 13 and Fig. 15 is a developed view of the internal surface of the cylinder, showing the grooves or slots that are formed therein;

Fig. 16 is a diagrammatic view showing the driving elements so located on the compressor shell and driven cylinder as to eliminate relative reciprocation thereof; and Fig. 17 is an elevation of a modified crank arm.

Referring to the drawings and the construction shown therein, the reference numerals 1 and 2 designate the bottom and top sections of the revolving hollow shell of our improved compressor the interior of said shell constituting a fluid receptacle, 2′ a boss which functions as a counterweight, 3 the bolts for securing the two sections and an interposed gasket 4 together, and 5 a pulley groove for the driving belt that is formed at the juncture of the two sections. The lower section has a reduced depending neck 6, the same having a central counterbored passage, as indicated by the reference numerals 7 and 8, and opposing ducts 10 which afford communication between the portion 8 of such passage and a flared recess 11 which surrounds the upwardly projecting hollow boss or sleeve 12 formed on said neck 6 and which boss is provided with a lubrication aperture 13. A shank 15 of a stationary piston member 16 is mounted in said sleeve 12, such shank extending at an oblique angle, preferably at about 30° to the axis of the piston 16. The latter has a hollow chamber 17 formed therein which is in communication with a vertical duct 18 which extends through the shank 15 and is adapted to deliver compressed fluid externally of the shell, for example to a conduit that delivers compressed refrigerant to a condenser of a refrigerating unit (see Fig. 9). An oblique duct 19 intersects the upper end of another vertical duct 20, which also extends through the shank 15, but is independent of the duct 18 and affords communication between the internal chamber of the revolving shell and an external source of fluid supply, for example the evaporator on the "low side" of a refrigerating unit (see Fig. 9). The upper end of the chamber 17 is counterbored for the reception of a gasket 22 and in insertible valve retainer unit 23, which latter is threaded into said piston, the same having a valve seat 24, a valve 25, preferably formed of three triangular metal sheets superimposed on each other and each of which is of slightly less over-all length than the internal diameter of said unit 23, the same being retained against escape by a looped spring wire retainer 26 that is snapped into an annular groove formed in the inner wall of said unit 23.

Said piston is preferably provided with piston rings 28 and to the lower end thereof is secured a grooved arcuate oil flipper 29 which serves, during the rotation of the shell of the compressor, to direct oil from the zone adjacent the side walls of the lower section 1 of such shell inwardly along the groove of said flipper to oil hole 13 and also against the bottom of piston 16 and the bottom of the inner wall of a rotary-reciprocating cylinder 35 mounted on said piston 16, whereby effective lubrication of the piston and cylinder walls is accomplished. Said cylinder 35 has a top terminal flange 36 and a lateral boss 37 to which is pinned a cylindrical crank arm 38 which, in the construction shown in Fig. 1, projects at right angles to the longitudinal axes of both said cylinder and said piston 16. Another lateral boss 40 is formed on the outer wall of the cylinder and a hollow weighted member 41 is slidably mounted on a bolt 42 that is threaded into said boss, said weight being normally depressed when the machine is at rest by a compression spring 43 which is mounted within the member 41 and reacts against the inner face of the head of said bolt and the adjacent face of said hollow member 41. A cylinder head 45, together with a sealing gasket 46, are secured by means of cap screws 47 to the flanged end 36 of the cylinder. Said head 45 has an annular recess 48 in which is an annular valve seat 49 against which a disc valve 50 is adapted to periodically seat, said valve being generally similar to the valve 25. A looped spring wire retainer 51, which is snapped into an annular groove formed on the inner wall of said chamber 48, serves to loosely retain said valve in said chamber.

An angular arm 55, which is secured to a leaf spring 56 which is in turn secured to the cylinder by means of a cap screw 57 and spacing washer 58, carries a stop screw 59 upon which is mounted an adjusting nut 60 which permits of the adjustment of said screw to such a position as to hold the valve 50 off of its seat 49 either when the machine is at rest and the parts are in the position shown in Fig. 1 or upon the initial starting of the motor which operates the compressor, whereby the free escape of refrigerant gas from the cylinder 35 will be permitted until such time as the weight 41 flies outwardly and under the urge of centrifugal force lifts arm 55 upwardly against a stop 61 that is secured to the cylinder head, whereupon said screw will be likewise elevated out of contact with said valve 50 and the latter will be permitted to function normally.

A lug 65 and also a pair of lugs 66, 66′ are formed on the inner wall of section 1 of the shell of the compressor and on the former is mounted a bolt 67, the head 68 of which constitutes a saddle, and which is retained in said lug 65 by means of a nut 69. A cross bar 70 is secured to the said lugs 66, 66′, and a laminated leaf spring 71, which is secured by means of a cap screw 72 to said plate 70 and also to the lug 66′, serves as a bottom support for a substantially spherical centrally apertured member 73, in which is slidably mounted the cylindrical arm 38. The position of the support 67 is so adjusted as to cause said spherical member 73 to slightly compress the spring 71 and thereby said spherical member 73 is held against escape from said saddle 68 by said spring 71, irrespective of the rotary motion of said member 73 under the influence of the arm 38.

The neck 6 of section 1 of the shell is mounted on the outer raceway 75 of a roller bearing, which raceway is snugly fitted in the enlarged bore of said neck 6, and the inner raceway 76 is shrunk on said shank 15. The rollers 77 are obliquely disposed to more effectively take up the thrust exerted by the rotation of said shell upon said bearing, all in the well known manner.

In order to prevent the escape of refrigerant and/or oil from the shell of the compressor, we provide sealing means, comprising a metal sleeve 80 which has a terminal flange on which is formed an eccentric annular rib 81 that is adapted to permanently engage the outer end of the inner raceway 77. A flexible rubber or composition gasket 83 and a metal reinforcing washer 84 are interposed between the neck 6 and a centrally apertured terminal cap 85 that is secured to said neck by cap screws 86. The central aperture b of washer 84 is of slightly larger diameter than the maximum diameter of the flanged end of sleeve 80 which it surrounds. Said cap has a hollow bonnet 87 in which is mounted a coil spring 88 that is compressed between the inner face of said bonnet 87 and a washer 89 which surrounds the outer end of said sleeve 80. The shank 15 is mounted in the flanged block 95, being secured thereto by a set screw 96, and said block is in turn mounted on a suitable base 97. Rubber blocks 98, which function as shock absorbers are loosely mounted in four corner recesses formed in the bottom of said base, and these blocks which each have a central cylindrical aperture 100 extending completely therethrough are secured to the floor on which the base 97 rests by screws 101. Apertures 100 are adapted to receive pins 102 that serve to loosely connect said blocks to said base 97, and these pins are of substantially less diameter than said apertures 100, whereby as shown, but a very small portion of the perimeter of said pins will be in engagement with the inside surface of the aperture 100 and thus vibrations are effectively absorbed.

In Fig. 10 we have illustrated a construction of compressor wherein a stationary, obliquely disposed cylinder 130 is formed on the upper end of shank 15 which generally corresponds to shank 15 shown in Fig. 1, except that the refrigerant intake conduit 20 intersects a right angle bore 19′ which affords communication with the interior of the compressor shell or so-called crank case and the exhaust valve unit 131 is mounted in the recess formed on the inner surface of the bottom of said cylinder. A rotary-reciprocating piston element 132 is mounted in said cylinder, the same projecting through the open top thereof, and an intake valve unit 133, which controls the flow of refrigerant from the chamber of the compressor shaft into an intake conduit 133′ that extends centrally through said piston, is mounted in the top of said piston. An arm 134, which is secured to the upper end of said piston, and projects outwardly at right angles therefrom across the top of the cylinder and thence downwardly in parallelism with the wall of said cylinder without contacting therewith, serves to connect the piston with the crank arm 38 similar to the crank arm shown in Fig. 1.

In Fig. 11 the compressor construction shown has the piston 140 mounted vertically in such a manner that its longitudinal axis coincides with that of the shank 15 and said piston has an exhaust valve 141 mounted in its upper end. In order to prevent rotation of said piston relative to the cylinder a pin 142 is mounted in the side of said piston, the same being adapted to project into a key-way 143 that projects vertically along the inner wall of a cylinder 144, the same extending from the bottom thereof to a level just above the top of said pin or key 142. An inlet valve 145 is positioned in the top of the cylinder for controlling the admission of refrigerant gas from the chamber in the shell of the compressor. A ring 146 is rotatably mounted in an obliquely disposed peripheral groove 147 that is formed on the outer wall of said cylinder and the crank arm 38 is rigidly connected thereto.

In the modification shown in Fig. 12, a vertically disposed piston 150 is employed, but the same is mounted off-center with respect to the shank 15, and said piston has an exhaust valve 151 mounted in the upper end thereof and is adapted to receive the vertically mounted cylinder 152 that is in turn provided with an intake valve 153 in the head thereof. The crank arm 38 is directly secured to the outer wall of the cylinder in the manner similar to that in which the crank 38 is connected to cylinder 35 shown in Fig. 1, except that such crank arm projects at an oblique angle with respect to the longitudinal axis of the cylinder in lieu of projecting at right angles therefrom as is the case in the construction shown in Figs. 1 and 10.

In lieu of controlling the flow of refrigerant through the system by means of inlet and exhaust check valves, either the inlet valve 50 or both of these valves may be dispensed with. In Fig. 13, we have illustrated an arrangement whereby both of the check valves 25 and 50 have been eliminated and the flow of refrigerant is directed through different ports to inlet and exhaust conduits of the piston. In order to accomplish this, the piston 160 is provided with a port 161 on the periphery thereof, which forms one terminal of an inlet conduit 162 that extends upwardly through the piston and discharges through the top thereof. Another port 163 on the periphery of the piston forms one terminal of a conduit 164 that communicates with the exhaust conduit 18'. The cylinder 165 has a closed upper end and has a spiral groove 166 formed in its inner wall and a spiral slot 167 which extends through the cylinder wall. Assuming the cylinder is rotating in the direction indicated by the arrow in Fig. 13, and the parts are in the position therein shown, which represents the start of a new cycle in the operation of the compressor, the refrigerant chamber in the shell of the compressor and the intake conduit 162 will be cut off. As the cylinder continues to rotate a slight suction will first be created in cylinder head and then the end $v$ of slot 167 will come into registry with port 161 and refrigerant gas will be sucked through conduit 162 into the head of the cylinder and this will continue throughout the suction stroke, since the slot 167 is long enough to admit gas throughout the suction stroke until the end of the suction stroke, at which time the end $u$ of slot 167 will pass out of registry with port 161 and further admission of gas into the cylinder will be cut off. Upon the further rotation of the cylinder the compression stroke immediately commences and at such time the lower end $y$ of bridging groove 166 moves over port 163 but compression of the gas in the cylinder continues until further rotation brings said end $y$ of such groove over or in registry with port 161, at which time the pressure of the compressed gas will have reached the point where it is equal to or exceeds the pressure in the high side of the system, thus insuring against backward flow of gas from high side into the compressor. Thereupon the compressed gas passes through conduit 162, port 161, bridging groove 166 to port 163, conduit 164 and exhaust conduit 18' to the condenser, such flow continuing so long as the bridging groove covers both ports 161 and 163. Further rotation then causes end $x$ of the groove 166 to pass beyond port 163 and thereby further passage of gas through the exhaust conduits 164 and 18' is cut off. Upon further rotation another cycle of operations as above described occurs. The porting arrangement for controlling the flow of refrigerant is especially advantageous where the compressor is directly connected to an electric motor and is required to revolve at high speeds of say 1750 R. P. M. since it enables us to eliminate the objectionable features of valve inertia or sluggishness so inherent when check valves are employed. Furthermore, all noise due to the employment of check valves is eliminated and as a consequence the operation of the compressor is remarkably silent.

In Fig. 16 we have shown diagrammatically a piston having an obliquely disposed shank, wherein the point of intersection of the longitudinal axis of the shank with a diameter of the base of the piston is off-center with respect to the center of said base. The advantage of this arrangement is that it is possible to so proportion the stroke and position of the crank arm that sliding movement of the latter, with respect to its universal joint or ball bearing, can be minimized, if not entirely eliminated. In this diagram, line $a$—$b$ represents the longitudinal axis of the obliquely disposed, off-center shank of a piston P; $c$—$d$ the longitudinal axis of the said piston and $x$ the point of intersection of these axes. The line $e$—$f$ represents a normal to axis $a$—$b$ drawn through point $x$. The line $g$—$h$ represents a normal to axis $c$—$d$, along the plane of the bottom of the cylinder, to the line $e$—$f$ and the distance $x$—$h$ will represent a length equal to one-half of the cylinder stroke. Another line $j$—$k$ is projected at right angles to axis $c$—$d$, the distance $x$—$j$ being equal to the distance $x$—$h$. As will be apparent from the foregoing explanation of said diagram, the points $g$ and $k$ will represent the center of the ball bearing of crank arm at opposite ends of the stroke and since these points are equi-distant from the point $x$, there will be no sliding movement in the ball bearing of the crank arm, such as arm 38 of Fig. 1, the position of which will coincide with the lines $g$—$h$ and $j$—$k$ at the different ends of the stroke. If, however, the longitudinal axis of the shank of the piston does not extend obliquely with respect to the longitudinal axis of the piston and the point of intersection of such axis of the shank with the bottom of the piston proper is not off-center with respect to the longitudinal axis of the piston, it is not possible to prevent the crank arm from sliding in its ball bearing.

If desired, the ball-bearing may be supported on the wall of the cylinder, or on the arm 134 employed in the construction shown in Fig. 10, and the crank arm may be rigidly connected to the section 1 of the shell.

In Fig. 17 we have shown a modified form of crank arm 38' which has a terminal, eccentrically disposed cylindrical boss 170 formed thereon, which may be employed in lieu of crank arm 38, whereby the mounting of the ball in a non-adjustable socket member carried by the compressor shell on the cylinder or arm 134, may be resorted to if desired. In those cases where the cylinder or piston have a rotary movement, as well as a reciprocating movement, the piston rings are held against rotation by pins $a$. We provide a radial slot $c$ in the flanged block 95, which extends vertically therethrough (see Figs. 1 and 8), in order to admit of dropping the compressor shank with the refrigerant intake and exhaust pipes already coupled thereto through said supporting block 95 and thereby it is possible to couple said pipes to such shank prior to positioning of the compressor in its mounting and also the removal of the compressor from its mounting without uncoupling the pipes therefrom can be accomplished.

As will be apparent from the foregoing, the rotation of the shell of the compressor shown in Fig. 1 by means of an electric motor which is coupled thereto by a belt that is reeved in the pulley groove 5, will cause the cylinder 35 to move spirally on its supporting piston 16 and, as it moves upwardly, then due to the fact that the intake valve 56 is normally held off of its seat by the screw 59 until such time as the velocity of rotation of the cylinder is sufficient to cause the weight 41 under the urge of centrifugal force to fly outwardly and lift said screw out of contact with such valve, the refrigerant gas will pass between the shell of the compressor and the cylinder through the valve 50 during the initial starting of the machine, since no compression of the gas within the cylinder can occur due to said valve 56 being held in an open position momentarily. As a result, the motor is relieved of all of the starting load or torque until such time as it attains full speed which, in the case of an electric motor operating at 1750 R. P. M., will occur within a fraction of a second from the moment of starting. Consequently, it is not necessary to employ an expensive motor for operating this machine, such for example as a repulsion-induction type of motor or a capacitor type of motor, but in lieu thereof an ordinary cheap split-phase type of motor can be employed without any objectionable over-load being thrown thereon or any possibility of the fuse protecting such motor being blown due to any overloading occasioned by the inertia of rest of the parts of the compressor and the consequent starting torque thereof. The upward spiral movement of the cylinder, as previously explained, creates a strong suction therein and refrigerant gas is drawn in through the valve 50 throughout the upward stroke of the cylinder. Due to the spiral movement of the cylinder on its piston, there will be no dead center at either end of the stroke, as the same is moving continuously without any interruption throughout the entire operation irrespective of the reversal in the direction of movement of the cylinder on the piston. Upon the down stroke of the cylinder, the valve 50 will close and valve 25, which has been previously closed, will open and the compressed gas will be discharged through the exhaust pipe 18 into the condenser, thence passing to the sub-tank, thence to the pressure reducing or so-called expansion valve, thence to the evaporator and back through the intake pipe and conduits 20 and 19 to the chamber within the compressor shell. In the construction shown in Fig. 10, the operation will be similar to that of the compressor shown in Fig. 1, except that the crank arm 38, being connected to the angular arm 134 carried by the piston, will cause to and fro spiral movement of the piston 132 in the cylinder 138. In the construction shown in Fig. 11, the cylinder 144 will be prevented from any spiral movement on the piston 140, since the ring 146, which is carried by the crank arm 38, can rotate in the oblique groove 147 and said piston being keyed to the cylinder, the latter can only reciprocate thereon. In the construction shown in Fig. 12 the operation of the compressor will be substantially identical with that shown in Fig. 1, since in this case the crank arm 38 is mounted obliquely on the cylinder 152, which latter rotates spirally to and fro on the vertical piston 150, the latter being, as stated, mounted off-center of its shank 15. In the operation of the compressor shown in Fig. 13, wherein the flow of refrigerant is controlled by means of a porting arrangement, essentially the same action occurs, except for the fact that there are no movable valves employed as in the type of compressor shown in Fig. 1. The manner in which the ports are alternately covered and uncovered by the spirally rotating cylinder has previously been explained.

Among the various advantages possessed by our improved refrigerating and air-conditioning unit, are the fact that it employs no fly-wheel, since the compressor shell functions as a fly wheel and can be designed to be of a suitable weight to insure that the machine will run smoothly without flickering of the lights occurring in the lighting circuit which operates the machine. Also the piston shank, being integral, can be made of cast steel and can be bent to shape either before or after the machining thereof, and thus the employment of an expensive forged crank shaft, such as formerly required in the reciprocating type compressors, can be avoided. Furthermore, no connecting rod or wrist pins are employed which can work loose or become noisy due to wear. The fact that we employ in our improved construction a centrifugal unloader and the fact that as previously stated there is no dead center in the movement of the cylinder or its piston or, vice versa, in those cases where a moving piston is employed, it is possible for us to eliminate the objections commonly met with where it is attempted to employ an over-hung connection between the driving member, in this case the shell of the compressor, and the cylinder, such for example as the crank arm 38 which is secured to one side of the cylinder and is actuated by the ball carried on the compressor shell, or vice versa, as heretofore explained. As a consequence, the operation of our compressor is extremely smooth and reliable even when employing refrigerants which operate under extremely high pressures and, without the association of the unloader, with compressors of this type, such smooth and reliable operation of the compresosr could not be accomplished with anything like the same degree of satisfaction. The fact that the weighted element of the unloader is elastically mounted on the pin 42 which is carried by the cylinder and not mounted on the lower end of arm 55 insures against vibration thereof, whereas were the same mounted on the arm 55, there would be a tendency for the same to chatter and develop objectionable noise.

Further advantages of our invention reside in the fact that there is a definite amount of heat interchange between the hot exhaust gases and the comparatively cool inlet gas passing through the shank of the piston and the piston itself and thus the same are maintained at a more normal temperature and the over-heating of the oil between the bearing surfaces is minimized, and thus also the sealing elements are maintained at a lower temperature. The aforesaid absence of any dead center in the movement of the cylinder or of the piston eliminates the usual knock that occurs in most all compressors of standard construction. Furthermore, since all bearing slack or looseness is distributed over a wide segment of the revolution of the cylinder, as contrasted with the relatively narrow segment over which the same is distributed in the ordinary reciprocating compressor, such slack or play will be substantially absorbed and as a consequence not only is it possible to eliminate the tedious running-in operation which is customary to employ in the manufacture of compressors, but the compressor will remain quiet in operation even after long periods of use. In our new compressor also the alignment of the moving parts is much less of an important factor than in the standard reciprocating compressor, since it is a very simple matter to align the main bearings and once the same are aligned the universal ball joint automatically compensates for any misalignments such as might be caused by the slight variations in the angularity of the piston, the cylinder or crank arm. Furthermore, since the cylinder rotates on the stationary piston in our improved construction, the operation of the machine is rendered much quieter and furthermore the cost of manufacture of such a compressor, as compared with a reciprocating type of compressor, wherein the cylinder is stationary, is reduced, due to the fact there is less precision required in the machine work thereon. Since the ball of the universal joint in which the crank arm is mounted is adjustable in its cup and also because it is elastically mounted therein, no precision fits between the ball and its socket are required and even after long use the operation of these parts remains entirely quiet. As will be apparent, the heaviest pressure is exerted on the ball and crank arm in the downward or compression stroke, and this is absorbed by the rigid ball cup while on the up or suction stroke, there is considerably lighter pressure exerted on such ball and this can be conveniently absorbed by the spring mounting of such ball. By providing one-half of the pulley groove on each segment of the shell of the compressor, it is possible to materially reduce the cost of turning a groove on such casing by means of a forming tool. The fact that the cylinder assembly is sealed within the crank case further tends to muffle any noise. The adjustment of the cylinder head clearance is accomplished by merely adjusting the ball cup of the ball joint either up or down and such adjustment takes care of a wide range of jigging and machine variations, besides permitting of the exact clearance being maintained in all machines during manufacture by making a very simple adjustment. Still further advantages of our invention reside in the fact that due to the centrifugal projection of the oil to the outside of the chamber in the compressor case, the oil assumes a substantially hollow cylindrical form close to the shell and since the oil flipper terminates a short distance from the shell, the oil returned thereby is substantially free from grit, metal particles and the like which collect in the extreme outer layer of such hollow cylinder of oil and consequently said oil layer is not only very substantially cooled by contact with the rotating air-cooled shell of the compressor, but the portion of the oil which is re-circulated through the system has the impurities thereof separated or removed by centrifugal action. The gland seal becomes, in view of the vertical mounting of the compressor and the action of the oil flipper, a liquid seal thereby constituting the most effective type of gas seal and furthermore, even when the compressor and motor are mounted horizontally, as sometimes may be desirable, the oil flipper still tends to virtually maintain an oil seal around the stationary shank, since the bearing and sealing elements are virtually flooded at all times by the action of such flipper and the centripedal force which returns the oil to the bearing. Furthermore, in this same connection the centrifugal action or force exerted on the oil tends to prevent foaming or pumping of the oil as frequently occurs in other types of compressors. Not only is the oil positively prevented from reaching the inlet or exhaust valves of the cylinder which revolve within the hollow cylinder of the oil, but as a result of such action it is possible to employ much heavier oils without any objectionable foaming occurring, with the consequence that superior cushioning and lubrication of the parts is accomplished. The mounting employed for the compressor is such that comparatively little metal-to-metal contact exists between it and the base plate and as a consequence but little noise can be transmitted from the compressor to the base plate and thence to the refrigerator. Likewise the rubber mountings employed are such that there is but a minimum of contact between the supporting pins 102 and such mounting blocks, with a consequence that vibrations normal to gravity are very substantially absorbed.

If desired, in lieu of rotating the compressor shell, the shank and piston carried thereby can be rotated and the shell maintained stationary, but in such event it would be desirable to install a fly-wheel on said shank besides making other minor necessary changes in the valve arrangements and unloader and lubrication system.

Various modifications from the construction herein shown may be made without departing from the spirit of our invention as embraced within the scope of the appended claims.

Having thus described our invention, what we claim and desire to obtain by United States Letters Patent is:

1. In a compressor, the combination comprising a rotatable shell forming a refrigerant receptacle, a cylinder element mounted in said receptacle and having a compression chamber that is periodically in communication with the receptacle during the operation of the compressor, a piston element mounted in said cylinder and relatively reciprocatable with respect thereto, said piston having a shank element which projects through said shell; one of the said compressor elements being stationary, but relatively rotatable with respect to the shell, and the other element being capable of rotation and reciprocation with respect to said stationary element, driving means interconnecting one of said compressor elements with said shell and means for sealing the joint between said shell and said shank to prevent the escape of refrigerant therebetween.

2. In a compressor, the combination comprising a hollow rotatable fly-wheel whose external periphery is exposed to the atmosphere, including a shell forming a refrigerant receptacle, a piston element and a co-operating cylinder element both mounted wholly in said fly-wheel, one of said compressor elements being stationary, but relatively rotatable with respect to the fly-wheel and the other element being capable of rotation and reciprocation with respect to said stationary element and the shank of one of such piston and cylinder elements projecting through the shell of the fly-wheel, driving means interconnecting one of said compressor elements with said shell, valve-controlled means for periodically admitting the passage of refrigerant fluid from said receptacle to said cylinder during a suction stroke of the compressor and means for sealing the joint around said shank to prevent escape of refrigerant from said fly-wheel.

3. In a compressor, the combination comprising a rotatable shell forming a fluid receptacle therein, a piston element having a shank projecting through said shell, said piston extending obliquely with respect to a major axis of said shell, a snug fitting cylinder element mounted on said piston element and positioned within said shell, one of the said compressor elements being stationary, but relatively rotatable with respect to the shell, and the other element being capable of rotation and reciprocation with respect to said stationary element, driving means interconnecting one of said compressor elements with said shell, valve-controlled means for periodically admitting the passage of fluid from said refrigerant receptacle to said cylinder during a suction stroke of the compressor, whereby periodic compression of such fluid is accomplished during the to and fro movement of the reciprocatable element, and means for sealing the joint between the shank and the shell adjacent thereto to prevent the escape of fluid therebetween.

4. In a compressor, the sub-combination comprising a rotatable shell forming a refrigerant receptacle, a piston element, a cylinder element mounted thereon, a shank member rigidly connected to said piston and which projects through said shell, said piston and cylinder both being located wholly within said rotatable shell, one of the said compressor elements being stationary, but relatively rotatable with respect to the shell, and the other element being capable of rotation and reciprocation with respect to said stationary element, means for admitting refrigerant from the shell to the cylinder during the suction stroke of the compressor, a crank arm interconnecting said shell and said cylinder, one end of said crank arm being mounted in a substantially universal joint, and means for effecting spiral to and fro movement of said cylinder on said piston on rotation of said shell.

5. In a compressor, the sub-combination comprising a rotatable shell, a piston element projecting inwardly from a wall of said shell and having a shank portion projecting through said shell, a cylinder element mounted on said piston, one of said compressor elements being stationary, but relatively rotatable with respect to the shell, and the other element being capable of rotation and reciprocation with respect to said stationary element, means for interconnecting said piston and said shell and means for effecting spiral to and fro movement of said cylinder on said piston on rotation of said shell.

6. In a compressor, the sub-combination comprising a hollow fly-wheel including a shell forming a refrigerant receptacle, co-operating piston and cylinder elements mounted in said fly-wheel and extending obliquely into said receptacle, the shank of one of said elements extending through said shell, one of the said compressor elements being stationary, but relatively rotatable with respect to the shell, and the other element being capable of rotation and reciprocation with respect to said stationary element and means for connecting one of said elements to said shell for effecting spiral to and fro movement of such element upon rotation of said fly-wheel.

7. In a compressor, the sub-combination comprising a hollow fly-wheel having co-operating piston and cylinder elements mounted therein, one of said compressor elements being stationary, but relatively rotatable with respect to the fly-wheel, and the other element being capable of rotation and reciprocation with respect to said stationary element, means for admitting refrigerant from the interior of said fly-wheel to the cylinder during the suction stroke of the compressor and means pivotally connecting one of said elements to said fly-wheel.

8. A compressor, comprising a hollow rotatable shell, an electric motor arranged to drive the same, co-operating piston and cylinder elements mounted therein, one of the said compressor elements being stationary, but relatively rotatable with respect to the shell, and the other element being capable of rotation and reciprocation with respect to said stationary element, overhung means projecting laterally from one of said elements and connected to said shell, valve-controlled means for admitting refrigerant from said casing to said cylinder during the suction stroke of the compressor and unloading means carried by one of said elements for relieving the motor circuit of undue overload when circuit through the motor is initially closed and the motor commences to operate.

9. In a compressor, the combination comprising co-operating piston and cylinder elements, one of which is rotatable and the other stationary, a motor for rotating said rotatable element, inlet and exhaust valves arranged to control the flow of refrigerant fluid to and from said cylinder, and means for momentarily holding the inlet valve open when the said rotatable member commences to rotate to relieve the starting load otherwise imparted to said motor, said means including a slidable, elastically mounted weighted member laterally mounted on said rotatable element, a spring-pressed co-operating separate arm normally engaging said weight and means carried by said arm for normally holding said inlet valve open until said weight, under the urge of centrifugal force, moves outwardly from the position it assumes when the machine is at rest.

10. In a compressor, the combination comprising a rotatable hollow shell, co-operating piston and cylinder elements mounted therein, means for connecting said casing to one of the co-operating elements and for effecting rotation of such element with respect to the other co-operating element upon rotation of said shell and means for returning oil from the zone adjacent the inner wall of the shell during its rotation toward the center thereof.

11. In a compressor, the sub-combination comprising a rotatable shell forming a fluid receptacle co-operating cylinder and piston elements extending obliquely to a major axis of said shell, said cylinder and piston elements being mounted wholly within said receptacle, one of the said compressor elements being stationary, but relatively rotatable with respect to the shell, and the other element being capable of rotation and reciprocation with respect to said stationary element, a crank arm interconnecting said shell and one of said elements and arranged to effect spiral to and fro movement thereof on the other element.

12. In a compressor, the combination comprising a rotatable hollow shell, co-operating piston and cylinder elements mounted therein, means for connecting said casing to one of the co-operating elements and for effecting rotation of such element with respect to the other co-operating element upon rotation of said shell, and means including an arcuate, longitudinally grooved flipper element carried by the rotatable element for returning oil from the zone adjacent the inner wall of the shell, during its rotation, toward the center thereof.

13. In a compressor, the combination comprising a rotatable shell co-operating piston and cylinder elements mounted therein, one of which is stationary and the other rotatable as well as reciprocatable, means for connecting said rotatable element to said shell, an inlet conduit and an outlet conduit in said stationary element and means for periodically sealing and opening communication between the interior of the cylinder and the respective inlet and outlet conduits during the relative to and fro spiral movements of said piston and cylinder elements.

14. In a compressor, the sub-combination comprising a rotatable shell forming a fluid receptacle, co-operating piston and cylinder elements mounted in said receptacle, one of the said compressor elements being stationary, but relatively rotatable with respect to the shell, and the other element being capable of rotation and reciprocation with respect to said stationary element and means for connecting the shell to one of said co-operating elements to effect its reciprocation upon rotation of said shell.

15. In a compressor, the sub-combination comprising a hollow rotatable shell forming a fluid receptacle, co-operating piston and cylinder elements mounted within said receptacle, one of the said compressor elements being stationary, but relatively rotatable with respect to the shell, and the other element being capable of both rotation and reciprocation on said stationary element and means, including a crank arm, for connecting the movable element to said shell to effect reciprocation of said movable element simultaneously with the rotation of said shell.

16. In a compressor, the sub-combination comprising a hollow rotatable shell forming a fluid receptacle, co-operating piston and cylinder members mounted within said receptacle, one of said members being reciprocatable and the other immovable and serving as a guide for the other during its reciprocation; and means, including a crank arm and a ball-and-socket joint, for connecting the reciprocatable member to said shell to effect reciprocation of said movable member simultaneously with the rotation of said shell, said socket being adjustable longitudinally in a plane that includes said crank arm.

17. In a compressor, the sub-combination comprising a shell forming a refrigerant chamber, co-operating piston and cylinder elements associated therewith, valve-controlled means affording communication between said chamber and said cylinder, one of said compressor elements being stationary and the other movable, and means, including a rotatably mounted universal joint disposed laterally of and wholly outside the side wall of the cylinder element and also connected to said movable element, for effecting reciprocation of said movable element and also for simultaneously effecting its rotation about an axis oblique to the axis of rotation of said universal joint.

18. In a compressor, the sub-combination comprising piston and cylinder elements, one of which is mounted so as to remain stationary during the operation of the compressor and the other of which is movably mounted, a rotor member and means including a connecting rod and a universal joint disposed laterally of and wholly outside the side wall of the cylinder element and also connecting said movable element and said rotor and for positively effecting the simultaneous rotation and reciprocation of said movable element.

19. In a compressor, the sub-combination comprising piston and cylinder elements, one of which is mounted so as to remain stationary during the operation of the compressor and the other of which is movably mounted, a rotor member, means including a connecting rod and a universal joint disposed laterally of and wholly outside the side wall of the cylinder element and also connecting said movable element and said rotor and for positively effecting the simultaneous and continual rotation and reciprocation of said movable element, such reciprocation being along an axis extending obliquely to the axis of rotation of said rotor member.

20. In a compressor, the sub-combination comprising a rotor, reciprocatably and rotatably associated piston and cylinder elements and the axis of each of which projects at an oblique angle to the axis of the rotor and a universal joint connection loosely connecting one of said elements to said rotor and disposed laterally of and wholly outside the side wall of the cylinder element.

21. In a compressor unit, the combination comprising an hermetically sealed housing, compressor elements including a piston and cylinder mounted therein, means including a crank arm and a universal joint for effecting simultaneous rotation and reciprocation of said compressor elements relative to each other disposed laterally of and wholly outside the side wall of the cylinder, means for affording communication between the interior of said cylinder and the interior of said housing surrounding the same during the suction stroke of compressor, means for admitting fluid from an external source into said housing and means for conducting compressed fluid directly from said cylinder to a point external of said housing.

22. In a compressor, the sub-combination comprising piston and cylinder elements rotatably and reciprocatably associated together, a rotor and a universal joint connection, including a rectilineally slidable element, loosely connecting one of said piston and cylinder elements to said rotor, said slidable element projecting outwardly from the element so connected to the rotor to a point well beyond the outer surface of its side wall.

23. In a compressor, the sub-combination comprising piston and cylinder elements rotatably and reciprocatably associated together, a rotor, and means, including a longitudinally slidable element and a rotatable bearing co-operatively associated therewith and mounted wholly outside the side wall of the cylinder element, operatively inter-connecting said rotor and one of said piston and cylinder elements constraining such element to turn with the rotor and to effect relative reciprocation between the said associated elements.

24. In a compressor, the sub-combination comprising a motor including a rotor, piston and cylinder elements reciprocally and rotatably associated with each other, the axis of each of which elements projects at an angle to a plane that is normal to the axis of rotation of said rotor and a flexible joint connection including a reciprocable slide member and a freely movable bearing disposed externally of the cylinder element in which said slide is movably mounted for connecting one of said elements to said rotor.

25. A mechanism comprising a rotor mounted for rotation about a predetermined axis, concentrically associated piston and cylinder elements whose longitudinal axes respectively extend at an angle to a plane that is normal to the axis of rotation of said rotor, said elements being both relatively reciprocable and relatively rotatable with respect to each other, means including a reciprocable slide member and a freely movable bearing disposed externally of the cylinder element in which said slide is movably mounted for connecting one of said elements to said rotor whereby to constrain such element to rotate and reciprocate with respect to the other element upon rotation of said rotor, said piston constituting valve means operable during the relative rotation of the piston element with respect to the cylinder element and said cylinder element having a duct extending completely through its lateral wall and which is alternately brought into and then cut off from communication with the interior of the cylinder during the relative rotation and reciprocation of said piston and cylinder elements.

26. A mechanism comprising a rotor mounted for rotation about a predetermined axis, concentrically associated piston and cylinder elements whose longitudinal axes respectively extend at an angle to a plane that is normal to the axis of rotation of said rotor, said elements being both relatively reciprocable and relatively rotatable with respect to each other, means including a reciprocable slide member and a freely movable bearing disposed externally of the cylinder element in which said slide is movably mounted for connecting one of said elements to said rotor whereby to constrain such element to rotate and reciprocate with respect to the other element upon rotation of said rotor, said piston constituting valve means operable during the relative rotation of the piston element with respect to the cylinder element and having a duct which extends completely therethrough from its lateral face to and through the face of its head end and said cylinder element having a duct which extends completely through its lateral wall and one of the ducts of said cylinder and piston elements terminating in a spiral surface groove which is adapted to periodically register with a terminal port of the duct in the other element during the reciprocation and rotation of the cylinder elements.

27. In a compressor, a supporting structure for operating parts, a driving rotor, a pump unit including two elements—viz., a cylinder and a cooperating piston assembled in co-axial relation and provided with intake and exhaust valving, the common longitudinal axis of said elements intersecting the axis of rotation of the rotor at an oblique angle, one of the said elements being fixed to the supporting structure and the other being rotatable and reciprocatable with relation to the fixed element, a universally flexible joint positioned eccentrically on the driving rotor and outside the path in which the rotatable element reciprocates, and a crank arm connected with and projecting from the rotatable element laterally with respect to the longitudinal axis of the said rotatable element, the projecting end of the crank arm being slidably connected to the flexible joint, and one of the connections of the crank arm being rotatable.

28. In a compressor, a supporting structure for operating parts, a driving rotor, a pump unit including two elements—viz., a cylinder and a cooperating piston assembled in co-axial relation and provided with intake and exhaust valving, the common longitudinal axis of said elements intersecting the axis of rotation of the rotor at an oblique angle, one of the said elements being fixed to the supporting structure and the other being rotatable and reciprocatable with relation to the fixed element, a crank arm connected with and projecting from the rotatable element laterally with respect to the longitudinal axis of the said rotatable element, and a universally flexible joint positioned eccentrically on the driving rotor outside of the cylinder and normal to a plane that includes the longitudinal axis of the rotatable element and the point of intersection of the axis of the crank arm with the circumference of such rotatable element, the projecting end of the crank arm being slidably connected to the flexible joint and one of the connections of the crank arm being rotatable.

29. In a compressor, a supporting structure for operating parts, a driving rotor, a pump unit including two elements—viz., a cylinder and a cooperating piston assembled in co-axial relation and provided with intake and exhaust valving, the common longitudinal axis of said elements intersecting the axis of rotation of the rotor at an oblique angle, one of the said elements being fixed to the supporting structure and the other being rotatable and reciprocatable with relation to the fixed element, a ball and socket universal joint positioned eccentrically on the driving rotor and outside the path in which the rotatable element reciprocates, and a crank arm connected with and projecting from the rotatable element laterally with respect to the longitudinal axis of the said rotatable element, the projecting end of the crank arm being slidably connected to the ball member of the universal joint and one of the connections of the crank arm being rotatable.

30. In a compressor, a supporting structure for operating parts, a driving rotor, a pump unit including two elements—viz., a cylinder and a cooperating piston assembled in co-axial relation and provided with intake and exhaust valving, the common longitudinal axis of said elements intersecting the axis of rotation of the rotor at an oblique angle, one of the said elements being fixed to the supporting structure and the other being rotatable and reciprocatable with relation to the fixed element, a ball and socket universal joint positioned eccentrically on the driving rotor and outside the path in which the rotatable element reciprocates, and a crank arm connected with and projecting from the rotatable element laterally with respect to the longitudinal axis of the said rotatable element, the projecting end of the crank arm being slidably and rotatably connected to the ball member of the universal joint.

31. In a compressor, a supporting structure for operating parts, a driving rotor, a pump unit including two elements—viz., a cylinder and a cooperating piston assembled in co-axial relation and provided with intake and exhaust valving, the common longitudinal axis of said elements intersecting the axis of rotation of the rotor at an oblique angle, one of the said elements being fixed to the supporting structure and the other being rotatable and reciprocatable with relation to the fixed element, a crank arm connected with and projecting from the rotatable element laterally with respect to the longitudinal axis of the said rotatable element, and a ball and socket universal joint positioned eccentrically on the driving rotor outside of the cylinder normal to a plane that includes the longitudinal axis of the rotatable element and the point of intersection of the axis of the crank arm with the circumference of such rotatable element, the projecting end of the crank arm being slidably and rotatably connected to the ball member of the universal joint.

32. In a compressor, a supporting structure for operating parts, a driving rotor, a pump unit including two elements—viz., a cylinder and a co-operating piston assembled in co-axial relation and provided with intake and exhaust valving, the common longitudinal axis of said elements intersecting the axis of rotation of the rotor at an oblique angle, one of the said elements being fixed to the supporting structure and the other being rotatable and reciprocatable with relation to the fixed element, a ball and socket universal joint positioned eccentrically on the driving rotor and outside the path in which the rotatable element reciprocates, and a crank arm connected with and projecting from the rotatable element laterally with respect to the longitudinal axis of the said rotatable element, the projecting end of the crank arm being slidably and rotatably connected to one of the complementary members of the universal joint.

33. In a compressor, a supporting structure for operating parts, a driving rotor, a pump unit including two elements—viz., a cylinder and a co-operating piston assembled in co-axial relation and provided with intake and exhaust valving, the common longitudinal axis of said elements intersecting the axis of rotation of the rotor at an oblique angle, one of the said elements being fixed to the supporting structure and the other being rotatable and reciprocatable with relation to the fixed element, a ball and socket universal joint positioned eccentrically on the driving rotor and outside the path in which the rotatable element reciprocates, the ball being provided with a diametrical bore, and a crank arm rigidly connected with and projecting from the rotatable element laterally with respect to the longitudinal axis of the said rotatable element, the projecting end of the crank arm extending into the bore of the ball member of the universal joint and being fitted slidably and rotatably therein.

KATHERINE E. LIMPERT,
*Executrix of the Last Will and Testament of Sylvester A. Limpert, Deceased.*

ALEXANDER S. LIMPERT,
*Individually and as Executor of the Last Will and Testament of Sylvester A. Limpert, Deceased.*